United States Patent [19]

Viol et al.

[11] 4,142,931
[45] Mar. 6, 1979

[54] METHOD FOR MAKING FOLDING DOOR AND WALL PANEL SHELLS

[75] Inventors: Güenter Viol, Oldenburg; Werner Kohfeldt, Bloh, both of Fed. Rep. of Germany

[73] Assignee: Lignacord GmbH, Oldenburg, Fed. Rep. of Germany

[21] Appl. No.: 907,223

[22] Filed: May 18, 1978

[51] Int. Cl.$^2$ .......................... B32B 31/00; E06B 3/12
[52] U.S. Cl. ...................................... 156/257; 156/268; 160/84 R; 160/231 R
[58] Field of Search ............................... 156/257, 268; 160/231 R, 231 A, 84 R, 84 V, 84 H

[56] References Cited

U.S. PATENT DOCUMENTS

| | | | |
|---|---|---|---|
| 3,476,630 | 11/1969 | Viol et al. | 156/268 |
| 3,708,009 | 1/1973 | Viol et al. | 160/84 V |
| 3,943,022 | 3/1976 | Susnjara | 156/257 |

Primary Examiner—Douglas J. Drummond
Attorney, Agent, or Firm—Sughrue, Rothwell, Mion, Zinn and Macpeak

[57] ABSTRACT

A cover veneer 17 is lightly glued, face side down, to a chipboard 24, and overlayed by a rigidly glued, cross grain oriented veneer layer 18. Opposing grooves 25,26 are simultaneously cut into the veneer layer 18 and board 24, respectively, to define adjacent accordion folding panels 11–15, and recess 21 are provided around the grooves 26 to accommodate pliable hinge strips 19,20. The veneer unit 17,18 is then removed from the board, the board and unit are reversed, the hinge strips are inserted in their recesses, and the board and unit are then firmly bonded together with the grooves 25,26 aligned. Grooves 22 and V-shaped notches 23 are then cut through to the grooves 25,26, respectively, leaving just the hinge strips to hold the panels together.

In an alternate embodiment, the veneer layer 18 is replaced with a continuous pliable web of plastic fleece 27, which also serves as the hinge strips.

11 Claims, 11 Drawing Figures

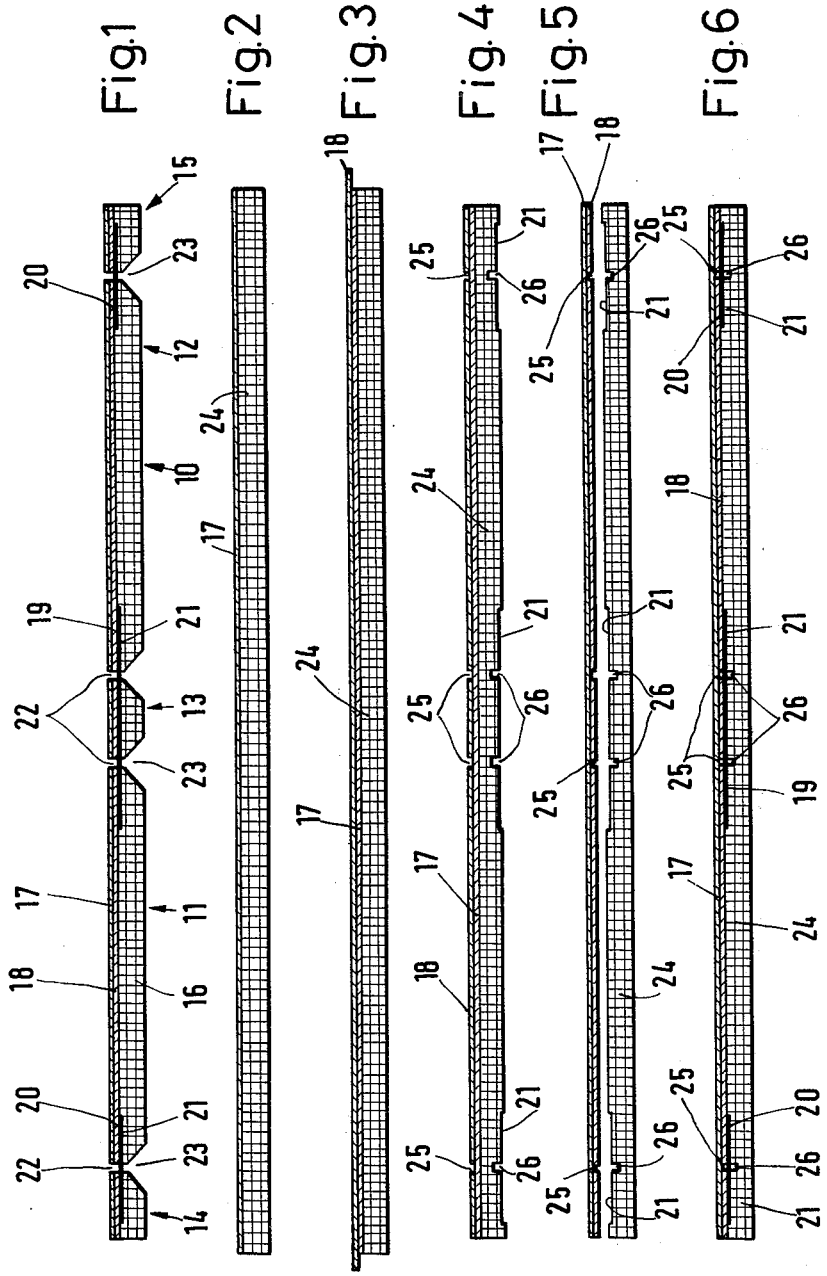

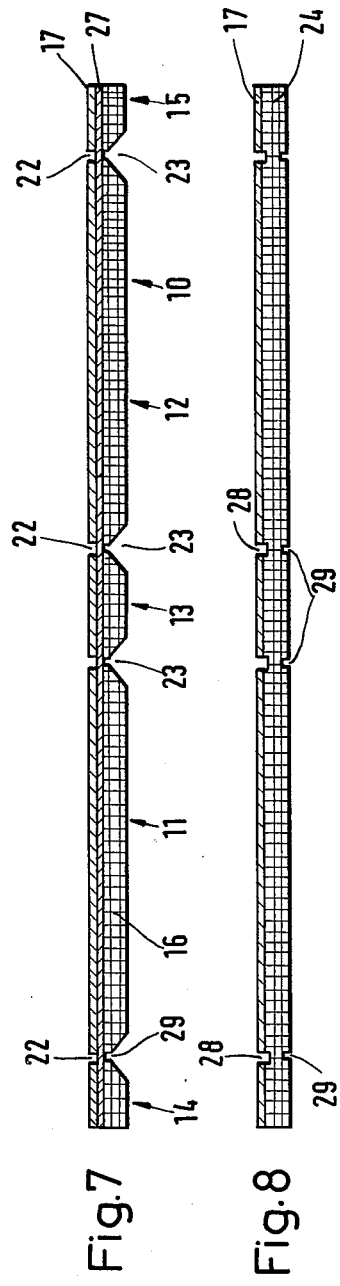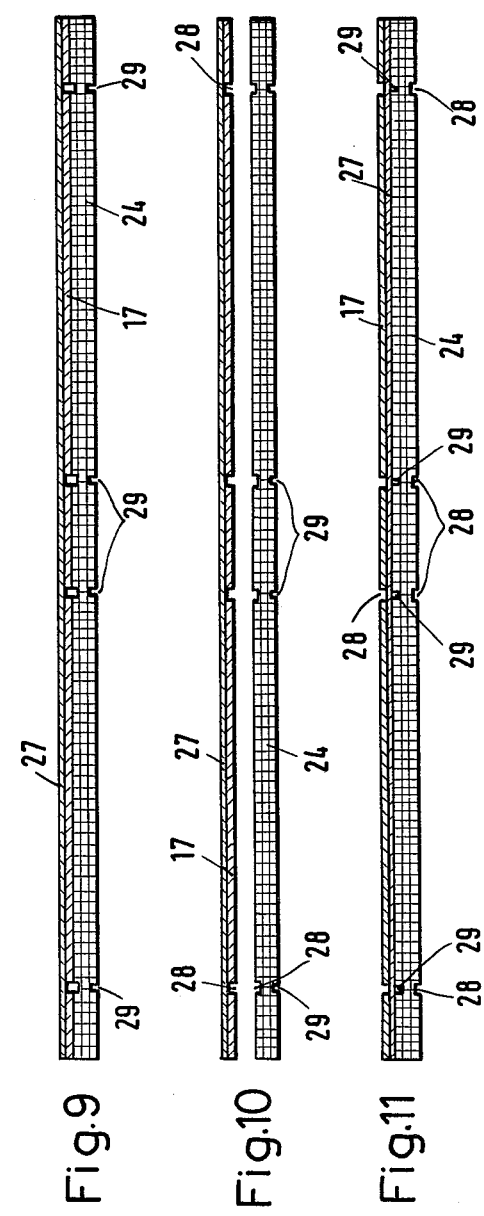

4,142,931

METHOD FOR MAKING FOLDING DOOR AND WALL PANEL SHELLS

BACKGROUND OF THE INVENTION

This invention relates to an improved method for the production of folding door and wall shells made of rigid panels or lamellae.

In such shells textile joint inserts are attached on the outside of the basic panel body, which may consist of chipboards. The joints inter-connect adjacent panels and cover up vertical expansion joints. An outside cover of veneer corresponds in height and width to the dimensions of the panel and leaves only a small strip of the joint insert exposed. On the reverse side of the shell the panels are limited from one another by V-shaped grooves.

A folding door comprises a rigid steel scissors frame which is covered on both sides by shells of the type described. This construction permits an accordion-like folding of the entire door over its full width.

In applicants' U.S. Pat. No. 3,708,009 a process is described according to which shells of the above described type are produced. The cover veneer corresponding to the panels is detachably and "negatively" secured, with the viewing or face side down, to a separate carrier board, and grooves are milled through the cover veneer in the area of future expansion joints between the panels. Hinge inserts are independently applied to a panel plate over further grooves which are covered by the inserts. The carrier board and the panel plate are then interconnected at their applied layers such that their respective grooves lie in the same cross-sectional planes. The carrier board is subsequently detached from the cover veneer so that the latter remains adhered to the panel plate and the hinge inserts, and possibly to a cross grain oriented veneer layer. V-shaped grooves are subsequently milled into the reverse side of the panel plate to define the adjacent panels.

This process is not only cumbersome and expensive because of the use of a separate carrier board, but the mutual alignment of the cover veneer and expansion joints on the panel plate is very difficult.

SUMMARY OF THE INVENTION

Briefly, and according to the present invention, a cover veneer is lightly glued, face side down, to a chipboard, and overlayed by a rigidly glued, cross grain oriented veneer layer. Opposing grooves are simultaneously cut into the veneer layer and board, respectively, to define adjacent accordion folding panels, and recesses are provided around the board grooves to accommodate pliable hinge strips. The veneer unit is then removed from the board, the board and unit are reversed, the hinge strips are inserted in their recesses, and the board and unit are then firmly bonded together with their respective grooves aligned. Expansion joint grooves and V-shaped notches are then cut through to the previous grooves, leaving just the hinge strips to hold the panels together.

In an alternate embodiment the veneer layer is replaced with a continuous pliable web of plastic fleece, which also serves as the hinge strips.

BRIEF DESCRIPTION OF THE DRAWINGS

In the drawings:

FIG. 1 shows a group of panels formed into a shell, in cross-section,

FIGS. 2 to 6 show individual production steps for the panel shell according to FIG. 1, also in cross-section, FIG. 7 shows another panel shell embodiment, and FIGS. 8 to 11 show individual production steps for the panel shell according to FIG. 7.

DETAILED DESCRIPTION OF THE INVENTION

The shells described here are components of folding doors or walls. Preferably, each shell is composed of several groups of panels connected by folding hinges. One group of panels 10 consists of at least two wide main panels 11 and 12, a narrow intermediate panel 13 and two terminal or end panels 14 and 15.

The individual panels 11–15 consist of a basic body 16, preferably of chipboard material, and a veneer cover 17 forming the outside of the shell. In the embodiment of FIGS. 1 to 6, a cross grain oriented veneer 18 is disposed between the basic body 16 and the veneer cover 17. The veneer 18 balances out tensions in the veneer cover 17. The veneer cover 17 and the cross grained veneer 18 are dimensioned such that the full surface of the basic body 16 is covered.

The embodiment of FIGS. 1 to 6 the individual panels 11–15 are interconnected by textile hinges links 19 and 20 inserted in recesses 21 in the basic bodies 16, whereby expansion joints 22 are formed between the panels.

The basic bodies 16 are displaced from each other by V-shaped grooves 23 on their lateral edges facing each other on the opposite or reverse side of the group of panels 10. These grooves 23 enable the folding of the panels relative to one another.

The group of panels 10 is produced from a correspondingly dimensioned, continuous chipboard 24 (FIG. 2). On the reverse side of the panels a continuous piece of veneer cover 17 is temporarily "negatively" glued on, whereby the viewing surface of this veneer faces the board 24.

Then, according to FIG. 3, a similar continuous, one-piece, cross grain oriented veneer 18 is applied on the outside. The latter is provided with grooves 25 in an additional operation as shown in FIG. 4, which are in the area of the future expansion joints 22. On the opposite side of the board 24, which in the finished group of panels 10 faces the veneers 17 and 18, grooves 26 are simultaneously cut in in equal cross sectional areas, and continuous recess 21 for the links 19 and 20 are also produced.

Then, as shown in FIG. 5, the veneers 17 and 18 are removed as a unit from the board 24. The two veneer layers and the board 24 are then turned 180° and firmly bonded together after the links 19,20 have been inserted in the recess 21. The grooves 25,26 now lie exactly opposite each other, separated only by the links 19,20.

The outside veneer cover 17 is now cut through in the area of the grooves 25 to form the expansion joints 22. At the same time the grooves 23 are milled in such that they adjoin the grooves 26. As a result, the individual panels 11–15 are separated from one another at the exact relative position of the individual layers.

Another embodiment is shown in FIG. 7, wherein the group of panels 10 is built up basically in the same way as that in FIG. 1. The cross grained veneer 18 provided in FIG. 1, however, is replaced here by an uninterrupted continuous web of pliable, tension resistant material, such as a plastic fiber fleece 27. A polypropylene fleece having a thickness of about 0.4 mm or a polyester fleece is suitable. This plastic fiber fleece 27 fulfills the functions of the cross grained veneer 18 and that of the links 19 and 20 of FIG. 1.

In the production of the shell shown in FIG. 7, the cover veneer 17 is first applied "negatively" to board 24 on its reverse side, corresponding to FIG. 2 of the previously described process. The veneer cover 17 is then provided with grooves 28 in the area of the future expansion joints 22. These grooves 28 extend, as is clear from FIG. 8, into the board 24.

Opposite the grooves 28 the board 24 is simultaneously provided with grooves 29 of lesser width than the grooves 28.

The veneer cover 17 is next covered on its outside by a continuous web of plastic fiber fleece 27, as shown in FIG. 9. The bonded layers 17 and 27 are then removed from the board 24, as shown in FIG. 10. The board 24 and the veneer cover 17 with the fiber fleece 27 are then turned or flipped over 180°. The fleece 27 and veneer cover 17, now on the outside, are then firmly bonded to the board 24 with the grooves 28,29 in alignment. The milling of the V-shaped grooves 23 on the reverse side of the board 24 now completes the fabrication process.

Because of the different widths of the grooves 28 and 29 the expansion joints 22 formed by them do not have a continuously equal width, and the sections of the veneer cover 17 are set back somewhat relative to the lateral edges of the basic panel bodies. This arrangement has the advantage that the veneer covers 17 are firmly supported over the entire surfaces of the panel bodies 16.

What is claimed is:

1. A method for the production of shells for folding doors and walls made of rigid panels interconnected by pliable hinge links and covered on the outside by a veneer cover having the same dimensions as the panels, characterized by: (a) detachably gluing a veneer cover (17) onto a board (24) which forms the basic panel bodies (16), (b) firmly gluing a cross grain oriented veneer (18) onto the reverse side of the veneer cover (17), (c) cutting grooves (26) in the area of hinge links (19,20) on the outside of the board (24), (d) cutting corresponding opposite grooves (25) in the cross grain oriented veneer (18), (e) cutting recesses (21) for the hinge lines (19,20) in the board (24), (f) removing the veneer cover-cross grain oriented veneer (17,18) as a unit, (g) reversing the board (24) and the veneer unit (17,18) 180°, (h) firmly bonding the board and veneer unit together with their respective grooves (25,26) aligned after inserting the hinge links (19,20) in their recesses, (i) cutting grooves (22) into the veneer cover (17) opposite the grooves (25), and (j) cutting V-shaped grooves (23) into the reverse side of the board (24) opposite the grooves (26).

2. A method as in claim 1, wherein the grooves (25) in the cross grain oriented veneer (18) and the grooves (26) opposite the grooves (25) are cut simultaneously.

3. A method as in claim 2, wherein the grooves (26) and recesses (21) are cut simultaneously.

4. A method as in claim 3, wherein the hinge lines (19,20) are inserted into their recesses (21) before the board and veneer unit are bonded together.

5. A method as in one of claims 1, 2, 3 or 4, wherein the grooves (22) in the veneer cover (17) and the V-shaped grooves (23) are cut simultaneously.

6. A method for the production of shells for folding doors and walls made of rigid panels interconnected by pliable hinge links and covered on the outside by a veneer cover having the same dimensions as the panels, characterized by: (a) detachably gluing a veneer cover (17) onto a board (24) which forms the basic panel bodies (16), (b) cutting grooves (28) through the veneer cover and into the board at the locations of future expansion joints (22), (c) gluing a continuous web (27) of pliable tension resistant material onto the reverse side of the veneer cover (17), (d) removing the veneer cover (17) and continuous web (27) as a unit from the board, (e) reversing the board and unit 180°, (f) firmly bonding togehter the facing surfaces of the board and unit, and (g) cutting V-shaped grooves (23) into the reverse side of the board at the grooves (28).

7. A method as in claim 6, wherein the continuous web (27) is a plastic fiber fleece.

8. A method as in claim 7, wherein the plastic fiber fleece is a polypropylene fleece.

9. A method as in claim 7, wherein the plastic fiber fleece is a polyester fleece.

10. A method as in claims 6, 7, 8 or 9, wherein an additional groove (29) is simultaneously cut on the opposite side of the board opposite each groove (28).

11. A method as in claim 10, wherein each additional groove (29) is narrower than the opposite groove (28).

* * * * *